United States Patent [19]

Shazer, Jr. et al.

[11] Patent Number: 5,176,928
[45] Date of Patent: * Jan. 5, 1993

[54] REDUCED CALORIE DIARY MIX

[75] Inventors: William H. Shazer, Jr., Hoffman Estates; Susanne E. Keller, Lake Zurich; Raymond A. Speckman, Champaign, all of Ill.

[73] Assignee: The NutraSweet Company, Deerfield, Ill.

[*] Notice: The portion of the term of this patent subsequent to Mar. 3, 2009 has been disclaimed.

[21] Appl. No.: 528,276

[22] Filed: May 21, 1990

Related U.S. Application Data

[63] Continuation of Ser. No. 228,353, Aug. 4, 1988, abandoned.

[51] Int. Cl.$^5$ .................................................. A23C 9/00
[52] U.S. Cl. ...................................... 426/42; 426/43; 426/548; 426/565; 426/580; 426/583; 426/613
[58] Field of Search .................... 426/42, 43, 548, 580, 426/583, 613, 565

[56] References Cited

U.S. PATENT DOCUMENTS

| | | | |
|---|---|---|---|
| 2,826,502 | 3/1958 | Sfortunato | 426/42 |
| 3,928,649 | 12/1975 | Cobb | 426/565 |
| 4,364,962 | 12/1982 | Tuchenhagen et al. | 426/42 |
| 4,626,441 | 12/1986 | Wolkstein | 426/548 |
| 5,093,137 | 3/1992 | Shazer, Jr. et al. | 426/583 |

FOREIGN PATENT DOCUMENTS 2076275 12/1981 United Kingdom ............... 426/42

OTHER PUBLICATIONS

Friberg, Food Emulsions, Marcel Dekker, Inc., N.Y., 1976 (pp. 168-169).
Tamine et al., 1985, *Yoghurt Science and Technology*, Pergamon Press, pp. 240, 242, 250-252.

*Primary Examiner*—Jeanette Hunter
*Assistant Examiner*—Helen Pratt
*Attorney, Agent, or Firm*—Jeffrey M. Hoster

[57] ABSTRACT

A reduced calorie diary mix for use in frozen dairy desserts and yoghurt is made from milk and/or milk products that have been treated with a lactase/beta-galactosidose enzyme which hydrolyzes lactose to glucose and galactose. This increases sweetness, reduces lactose crystallization problems and creates a greater freezing point depression. Aspartame or other high potency sweetners may be added without the need for additional bulking agents and/or bulk sweeteners.

20 Claims, No Drawings

REDUCED CALORIE DIARY MIX

This is a continuation of co-pending application Ser. No. 228,353, filed Aug. 4, 1988 now abandoned.

BACKGROUND OF THE INVENTION

In this diet conscious society, the regretful and painful abstinence from sweets and high calorie foods is necessary if one wishes to be fit and trim. Ice cream and other frozen novelty desserts often ranks high on the list of no-nos and must be foresworn much to the dismay of many sweet tooths. Whereas aspartame has become a very popular dietary sweetener in low-calorie soft drinks and other beverages (Schlatter et al. U.S. Pat. No. 3,492,131), the realization of a truly satisfactory low-calorie frozen dessert has not yet, until now, been achieved.

The problem in this area is that when sugar is removed from most if not all foodstuffs in an effort to reduce the caloric content, more than just sweet taste is noticeably removed. Sugar contributes to the mouthfeel of a particular food product and provides bulk or structure. Therefore, removal of the sugar consequently removes much of sugar's bulk and thereby renders the texture or consistency of the food unsatisfactory. As a result, the mere removal and replacement of sugar with a high potency low-calorie sweetener does not result in an appreciably satisfactory product since the low-calorie sweetener lacks the bulk of sugar.

Understandably then, in order to produce a frozen dessert, yoghurt or confection with no additional sugar added, a bulking agent must be added to the mix together with the high potency sweetener such as aspartame. The bulking agents currently available either add as many calories to the product as sucrose would were it not removed (as is in the case of the maltodextrins) and/or will have deleterious side effects such as diarrhea (as in the case of polydextrose and sorbitol).

If sugar is removed from a product, the bulking agent is required to be added in order to perform the functions (other than sweetness) of sucrose in order to obtain an acceptable product. If sugar is removed from a frozen dairy dessert in an effort to reduce calories for example, the absence of an added bulking agent will result in a dessert that is unacceptably hard and icy when frozen. Ice crystal formation from any unbound water becomes prevalent and the overall sensory perception is unpalatable.

It is an object of the present invention to provide a method for the production of a reduced calorie dairy mix which can be utilized in various dairy applications such as frozen dairy desserts and yoghurt wherein the sugar (sucrose and/or bulk contributing sweetener) has been removed yet no additional bulking agents are required. This is achieved through the enzymatic treatment of the disaccharide sugars naturally present in milk (lactose) so as to reduce them to their monosaccharide components. More specifically, milk ingredients traditionally used in the manufacture of ice cream, ice milk and yoghurt are treated with beta-galactosidase which cleaves lactose into glucose and galactose. This not only results in an increase in the sweetness of the composition, but also surprisingly does not require the addition of bulking agents in order to maintain an acceptable consistency, palatability and mouthfeel.

The use of an enzyme, particularly beta-galactosidase or lactase for short, in milk or milk based products, to reduce lactose to its constituents is well known in the art. The use of lactase to hydrolyze lactose to its monosaccharide constituents in milk and whey products, including frozen dessert applications is described by Holsinger, V., Applications of Lactose Modified Milk and Whey; Food Tech. 35 (1978). Trzecieski, U.S. Pat. No. 4,333,953 discloses the use of non-fat milk solids with lactase to produce a creamy ice milk.

U.S. Pat. No. 4,333,954, also to Trzecieski, also discloses a soft ice cream wherein lactase is added in order to reduce the ice crystallization problems of lactose in the ice cream. This is the familiar 'sandy texture' that results when 20-30% of the milk solid non-fat is replaced by demineralized whey powder. The sandiness defect has been recognized to be a direct function of the amount of lactose present in the ice cream which can be removed by the hydrolysis to its monosaccharide components by lactase. Albrecht, T., et al., Sandiness Defect in Ice Cream, Ice Cream Review 22 (1956) None of the prior art however, teaches the hydrolysis and removal of lactose, without subsequently putting in a bulking agent such as sorbitol or dextrose to replace the volume once occupied by the sugar.

All of the existing prior art however, demonstrates that sugar (sucrose) or other carbohydrate sweeteners can only be partially replaced in frozen desserts and confections by hydrolyzing lactose to form glucose and galactose. Addition of ingredients such as whey (high lactose) have been used as a partial replacement for sucrose; however no one has demonstrated the complete removal of sucrose and/or added carbohydrate sweeteners.

By using the process according to the present invention, a dairy mix that can be used in reduced calorie yoghurts, frozen confections and flavored milk is made possible wherein the lactose has been reduced to its monosaccharide components by treatment with beta-galactosidase. This increases sweetness, reduces ice crystallization and by creating a greater freezing point depression thereby improves the texture of the product. There is no need to add further bulking agents to substitute for the missing sucrose and the addition of aspartame or other high potency sweeteners or flavorings may be added for taste without an increase in calories.

SUMMARY OF THE INVENTION

A method for the production of a reduced calorie dairy mix and product useful in the manufacture of reduced calorie frozen desserts, yoghurts and flavored milk drinks is disclosed wherein the milk sugar lactose is broken down without the need for the addition of a bulking agent. Lactose is hydrolyzed to its monosaccharide components, glucose and galactose, by treatment of the milk or milk products with beta-galactosidase. The process increases sweetness, creates a greater freezing point depression and inhibits ice crystal formation when the mix is incorporated in the final product. The surprising absence of the need for any additional bulking agents results in a truly reduced calorie dessert or yoghurt.

DETAILED DESCRIPTION OF THE INVENTION

The method of the present invention yields a dairy mix which can be used in numerous dairy applications with improved characteristics over that known in the art. Whereas the hydrolysis of the milk sugar lactose to its monosaccharide components glucose and galactose is not surprising or new, the complete removal of added bulk sweeteners without their replacement with a bulking agent has not hereinbefore been possible. This mix, when incorporated into a frozen dairy dessert or yoghurt and sweetened with a high potency sweetener such as aspartame may therefore allow these categories to be characterized as truly reduced calorie and can be enjoyed by two fairly substantial segments of today's population. On the one hand, there are those that must restrict their caloric intake due to their being overweight. The reduced calorie dairy products made possible by the present invention will serve as a welcome respite in the world of dieting. There are also those who are lactose intolerant, who by consuming the sugar suffer flatulence, diarrhea, cramps, tissue dehydration and lack of calcium absorption. The ability to produce dairy products without the need for additional bulking agents avoids these problems.

The dairy mix of the present invention may be made from milk ingredients such as whole milk, skim milk, concentrated skim milk, evaporated skim milk or dairy whey. In normal milk, lactose comprises nearly 60% of the non-fat solids. Lactose also comprises 80-85% of the dairy whey solids and as is taught by the prior art, milk solids non-fat levels in frozen desserts should not exceed 13.3%.

Preferably, skim milk is first mixed with non-fat dry milk so that the milk solids non-fat is approximately 17%. The milk ingredient is then pasteurized and homogenized using conventional pasteurization and homogenization techniques (150°-175°) and (2000/500 p.s.i.) then cooled to approximately 100° F.

Enzyme treatment of the lactase may then be conducted in one of two alternative procedures. Beta-galactoside, approximately 10,000 u/l (u=1 μg. glucose that is produced from treatment of 5% lactose at a pH 7.0, room temperature, in 1 minute) may be added to the mixture immediately which is then cooled to 40° for a period of 24 hours. The mix may also be cooled first in which case the enzyme is then added and allowed to hydrolyze the lactase for 48 hours. The cooler the environment of the substrate, the slower the activity of the enzyme.

Beta-galactosidase or lactase may be obtained commercially from any one of a number of sources. Pfizer, Inc. produces a food grade liquid lactase which is an extract from *Candida pseudotropicalis*, a lactase fermenting dairy yeast. The enzyme may either be added directly to the dairy mix at approximately 10,000 u/l or may be immobilized in a resin or gel matrix. If the lactase is added directly to the dairy mix, it would preferably be deactivated through further heating after the hydrolysis time. This can be accomplished by a second pasteurization step, preferably a high temperature, short time (HTST) application. The enzyme is preferably removed because although it could be left in with no adverse effects on the mix, most commercial enzyme extracts may contain residues of other enzymes such as protease. These may then attack other dairy proteins resulting in their degradation and an undesirable product.

If the enzyme is immobilized in a gel or resin, a further pasteurization step is unnecessary since the enzyme is never blended or mixed together with the milk ingredients. The dairy mix may pass through the gel beads or resin in a column, through contact in a batch tank or by any one of the number of immobilized enzyme techniques known in the art. However the enzyme contacts the milk ingredients, once a sufficient time for enzyme-substrate contact is allowed to take place (usually approximately 24-48 hours) the mix may then be cooled to approximately 32°-50° F.

Hydrolysis of lactose to glucose and galactose reduces the lactose content, thereby allowing for a greater amount of lactose that can be initially added to the milk ingredients prior to enzyme hydrolysis. Enzyme hydrolysis can therefore increase the sweetness of the mix and since glucose and galactose are smaller molecules than lactose, the freezing point of the mix is reduced and the sandy texture of lactose crystallization avoided.

Once the dairy mix is sufficiently cooled after hydrolysis it is ready for any number of frozen dairy dessert and yoghurt applications. The milk solid portion of the dairy mix may be anywhere from 9.0-33.0% by weight of the overall product. Preferably, the milk solids comprise approximately 18-20% by weight of the final mix. Milk fat levels may be anywhere from 0-12% of the final dairy mix. High potency sweeteners such as aspartame, alitame, acesulfame-K, saccharin, cyclamate etc. may be added for sweetness without the need for additional bulking agents. Stabilizers such as carageenan, xanthan gum, microcrystalline cellulose, locust bean gum and other stabilizer compounds known in the art may be added as desired. Flavors, fruits and other ingredients may be added as desired according to the formulation of the dessert or yoghurt as known in the art. The mix may then be packaged in either single or multi-serving bulk packs and cooled to a desired consistency for consumption. Final freezing points can range from approximately $-1.0°$ C. to $-2.2°$ C., although the preferred temperature at which the mix is frozen after enzyme hydrolysis of the lactose and addition of the desired sweeteners, flavor compounds and the like is $-1.6°$ C. to $-1.9°$ C.

The following examples are incorporated herein to better describe and more fully set forth the method for practicing the present invention. They are for illustrative purposes only and should not be construed as limiting the spirit and/or scope of the claims.

EXAMPLE 1

The quantities of liquid milk, cream and non-fat dry milk (NFDM) are calculated based on the milk solids not fat (MSNF) and butter fat levels that are required to obtain a final mix composition of 18% MSNF and 4% butter fat. For example, skim milk at 8.8% MSNF, cream at 5.09% MSNF and 44.5% fat, and NFDM at 96.0% MSNF would require 7941 gm skim milk, 899 gm cream and 1099 gm NFDM for a 10,000 gm quantity of mix.

Mix together the liquid components and add NFDM (stabilizers and APM may be added at this point if desired or after heat treatment). The mix may also be heated to assist in dissolving the NFDM. Add approximately 10,000 u/l of commercial lactase (u=1 μg glucose produced from 5% lactose at pH 7.0, room temperature, in one minute) and hold the mix for 24 hours at 40° F.

The mix is heated to 140° F. and homogenized, then further heated to 170° F. in order to to pasteurize as required by GMP. The remaining dry ingredients including 600 p.p.m. aspartame may be added at 140° F. prior to homogenization. Cool mix and freeze.

EXAMPLE 2

An alternative to Example 1 would be to add all dry ingredients together and heat to 100° F. The lactase enzyme is added directly (10,000 u/l) at 100° F. and the mix is held for 1 hour. After 1 hour, continue to heat to 140°, homogenize, and pasteurize as for GMP.

EXAMPLE 3

The dairy mix can be formulated as in Example 1 and treated with an immobilized lactase in a resin bed. In this case, mix may be passed through resin after all the dry ingredients are added.

The formulations of MSNF level can be altered to any range as indicated in the patent. The butter fat levels can be changed to any value within the ranges set forth in the patent. The mix can then be treated as in Examples 1 to 3.

What we claim is:

1. A reduced calorie frozen dairy dessert including a diary mix which provides bulking properties, said dairy mix being produced by a process comprising the steps of:
   (a) heating a mix of milk ingredients to a sufficient temperature to promote the pasteurization of said ingredients; and
   (b) treating said ingredients with an enzyme for a sufficient period of time to reduce any inherent milk polysaccharides to their monosaccharide components; said frozen dairy dessert not including any added sugars or bulking agents.

2. The frozen dairy dessert according to claim 1 wherein said milk ingredients are selected from the group consisting of whole milk, skim milk, condensed skim milk and non-fat dry milk.

3. The frozen dairy dessert according to claim 2 wherein said pasteurization is carried out at approximately 145°–195° F.

4. The frozen dairy dessert according to claim 3 wherein said enzyme is added directly to said mixture of milk ingredients.

5. The frozen dairy dessert according to claim 3 wherein said enzyme is immobilized prior to its treatment of said milk ingredients.

6. The frozen dairy dessert according to claim 3 wherein said enzyme is beta-galactosidase.

7. The frozen dairy dessert according to claim 2 further comprising a high potency sweetener.

8. The frozen dairy dessert according to claim 7 wherein said high potency artificial sweetener is selected from the group consisting of aspartame, alitame, saccharin, cyclamate, acesulfame-K, sucralose, and their salts and mixtures thereof.

9. The frozen dairy dessert according to claim 8 further comprising a stabilizer.

10. The frozen dairy dessert according to claim 9 wherein said stabilizer is selected from the group consisting of carageenan, locust bean gum, xanthan gum and microcrystalline cellulose.

11. A reduced calorie frozen yoghurt including a dairy mix which provides bulking properties, said dairy mix being produced by a process comprising the steps of:
    (a) heating a mix of milk ingredients to a sufficient temperature to promote the pasteurization of said ingredients; and
    (b) treating said ingredients with an enzyme for a sufficient period of time to reduce any inherent milk polysaccharides to their monosaccharide components;
    said yoghurt not including any added sugars or bulking agents.

12. The yoghurt according to claim 11 wherein said milk ingredients are selected from the group consisting of whole milk, skim milk, condensed skim milk and non-fat dry milk.

13. The yoghurt according to claim 12 wherein said pasteurization is carried out at approximately 145°–195° F.

14. The yoghurt according to claim 13 wherein said enzyme is added directly to said mixture of milk ingredients.

15. The yoghurt according to claim 13 wherein said enzyme is immobilized prior to its treatment of said milk ingredients.

16. The yoghurt according to claim 13 wherein said enzyme is beta-galactosidase.

17. The yoghurt according to claim 12 further comprising a high potency sweetener.

18. The yoghurt according to claim 17 wherein said high potency artificial sweetener is selected from the group consisting of aspartame, alitame, saccharin, cyclamate, acesulfame-K, sucralose, and their salts and mixtures thereof.

19. The yoghurt according to claim 18 further comprising a stabilizer.

20. The yoghurt according to claim 19 wherein said stabilizer is selected from the group consisting of carageenan, locust bean gum, xanthan gum and microcrystalline cellulose.

* * * * *